United States Patent [19]
Hanks et al.

[11] Patent Number: 4,657,126
[45] Date of Patent: Apr. 14, 1987

[54] TWO-SPEED CLUTCH

[75] Inventors: James V. Hanks, Fridley; Edward Brooks, Robbinsdale, both of Minn.

[73] Assignee: Horton Manufacturing Co., Inc., Minneapolis, Minn.

[21] Appl. No.: 705,346

[22] Filed: Feb. 25, 1985

[51] Int. Cl.$^4$ .................... F16D 25/063; F16D 21/02
[52] U.S. Cl. ............................ 192/48.91; 192/85 A; 192/87.16; 192/91 A
[58] Field of Search ............... 192/48.91, 87.14, 87.15, 192/87.16, 87.1, 85 A, 18 A, 91 A

[56] References Cited

U.S. PATENT DOCUMENTS

| | | | |
|---|---|---|---|
| 2,436,968 | 3/1948 | Longfield | 192/18 A |
| 2,881,597 | 4/1959 | Jacobs | 62/133 |
| 2,909,255 | 10/1959 | Chung | 192/18 A |
| 3,037,602 | 6/1962 | Clements | 192/48.91 X |
| 3,253,686 | 5/1966 | Scheuerer | 192/18 A |
| 3,295,394 | 1/1967 | Whateley | 74/781 |
| 3,378,120 | 4/1968 | Miller et al. | 192/14 |
| 3,382,736 | 5/1968 | Abbott | 74/740 |
| 3,468,402 | 9/1969 | Edwards | 192/18 A |
| 3,497,046 | 2/1970 | Schilling | |
| 3,595,353 | 7/1971 | Beneke | 192/18 A |
| 3,638,773 | 2/1972 | Lewis et al. | 192/18 A |
| 3,667,581 | 6/1972 | Hanks | 192/18 A |
| 3,675,747 | 7/1972 | Obermark | 192/48.91 X |
| 4,195,717 | 4/1980 | Williams | 192/18 A |
| 4,403,526 | 9/1983 | Numazawa et al. | 74/740 |
| 4,482,038 | 11/1984 | Mason | 192/48.91 X |
| 4,534,454 | 8/1985 | Brooks | 192/18 A |
| 4,557,506 | 12/1985 | Hanks et al. | 192/85 A X |

FOREIGN PATENT DOCUMENTS 229910 10/1959 Australia .

Primary Examiner—Rodney H. Bonck
Attorney, Agent, or Firm—Peterson, Wicks, Nemer & Kamrath

[57] ABSTRACT

A two-speed clutch is shown according to the preferred embodiment of the teachings of the present invention for the selective rotational relation of an input shaft with a first or second sheeve unit having different diameters. The first sheeve unit is rotatably mounted to the input shaft. The second sheeve unit is mounted to a housing in turn rotatably mounted to the input shaft. The clutch includes a friction disc which is located between and frictionally interrelates with the first sheeve unit or the housing. The housing includes a single, reciprocally mounted piston for moving the friction disc. Utilizing a two-speed clutch of the present invention eliminates the requirement of two separate and complete drive units as in prior techniques. Furthermore, since the housing performs multiple functions, i.e., rotatably mounts the second sheeve unit to the input, slidably mounts the piston, acts as the interface for the second sheeve unit with the friction disc, and other functions, the two-speed clutch of the present invention greatly reduces the number of parts and results in a simplicity of construction. Furthermore, the two-speed clutch of the present invention provides a relatively dust and other element free environment for the piston and splined interconnection of the interfacing friction disc with the input.

20 Claims, 1 Drawing Figure

TWO-SPEED CLUTCH

BACKGROUND

The present invention relates generally to rotational control apparatuses, particularly to clutches, and more specifically to two-speed clutches.

It is often desired to control an output for operation at two distinct speeds. Prior to the present invention, such control was often provided by the use of two motors and two clutches for obtaining each of the distinct output speeds. The use of two-speed clutches in such control was often disadvantageous because of their size, expense, and disadvantageous operation due to breakdown, complicated controls, and similar deficiencies of prior two-speed clutches. Thus, a need has arisen for a two-speed clutch which overcomes the disadvantages of prior two-speed clutches and allows its use when control of an output is desired at two distinct speeds.

SUMMARY

The present invention overcomes these problems and disadvantages of prior two-speed clutches and provides a solution to this need by providing a clutch for selectively interrelating an input with one of a first output and a second output. An interface member rotatably related to the input is positioned between interface surfaces of the first output and a housing. The second output is rotatably related to the housing. A piston is reciprocally mounted in the housing and is rotatably mounted to and axially movable with the interface member. The piston is biased in the housing by springs which extend between the piston and a radially extending surface which is part of the housing. The interface surface of the housing is formed on the radially extending surface opposite to the springs. The interface member under the influence of the springs and fluid pressure introduced into a fluid pressure cylinder associated with the piston moves to rotatably relate with one of the interface surfaces of the first and second outputs. Therefore, the housing serves multiple functions including serving as the second output and reciprocally mounting the piston to reduce the number and complexity of the clutch components.

Thus, it is an object of the present invention to provide a novel two-speed clutch.

It is further an object of the present invention to provide such a novel two-speed clutch which eliminates the requirement of two separate drive units when it is desired to control an output at two distinct speeds.

It is further an object of the present invention to provide such a novel two-speed clutch including a multifunction housing which also forms an output of the clutch.

It is further an object of the present invention to provide such a novel two-speed clutch including greatly reduced number of components than prior two-speed clutches.

It is further an object of the present invention to provide such a novel two-speed clutch having a simplicity of construction.

It is further an object of the present invention to provide such a novel two-speed clutch which provides a relatively dust free environment for the piston and the structure which reciprocally mounts the piston relative to the input.

It is further an object of the present invention to provide such a novel two-speed clutch which may be supported by a shaft.

It is further an object of the present invention to provide such a novel two-speed clutch which is of compact construction.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
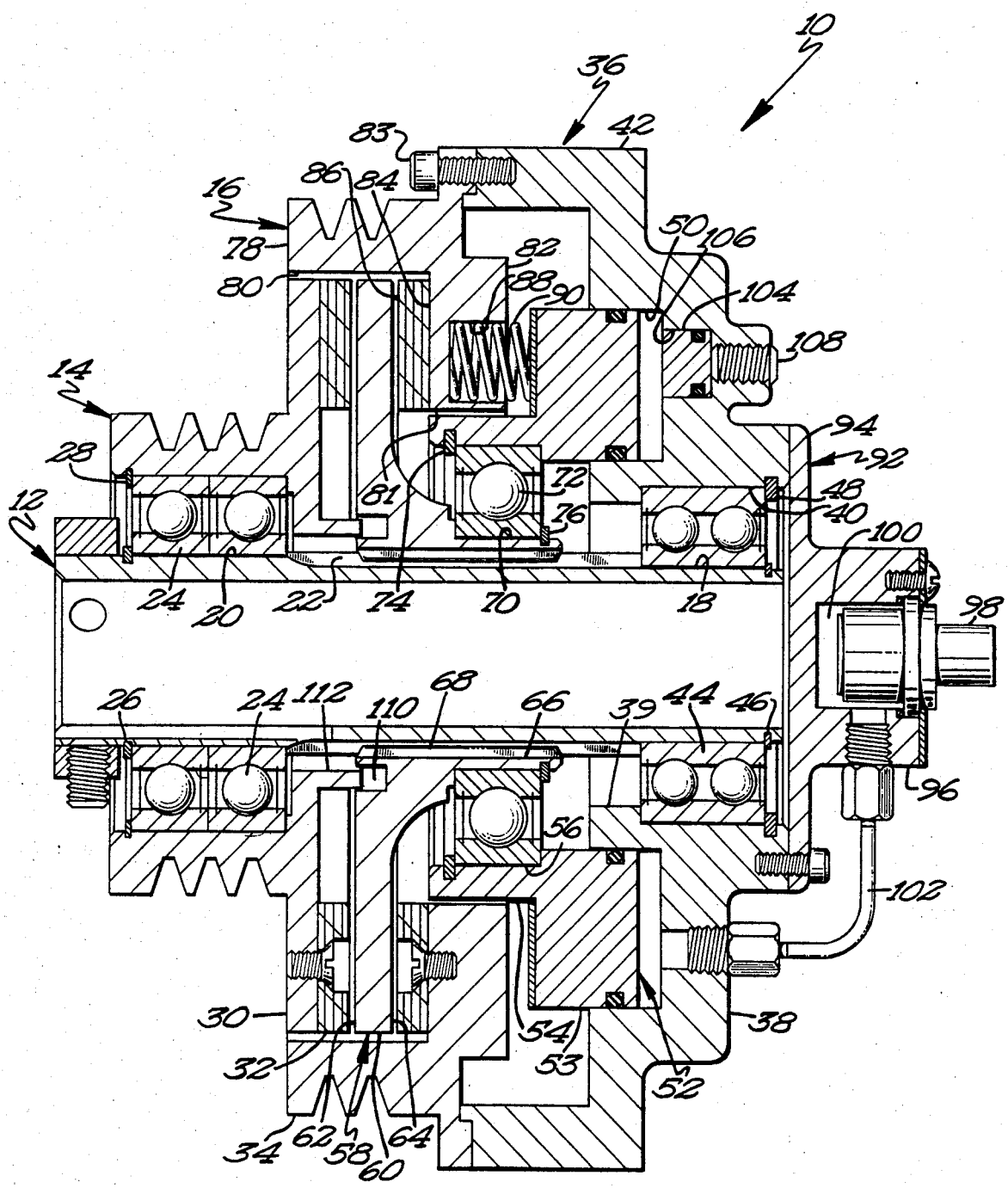
FIG. 1 shows a cross-sectional view of a two-speed clutch constructed according to the preferred embodiment of the teachings of the present invention.

The figure is drawn for ease of explanation of the basic teachings of the present invention only; the extensions of the figure with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Furthermore, when the terms "top", "bottom", "first", "second", "inside", "outside", "axially", "radially", "inward", "outward", and similar terms are used herein, it should be understood that these terms have reference only to the structure shown in the drawings as it would appear to a person viewing the drawings and are utilized only to facilitate describing the invention.

DESCRIPTION

A two-speed clutch according to the teachings of the preferred embodiment of the present invention is shown in the drawings and is generally designated 10. Clutch 10 generally includes an input 12 for selective rotational relation with a first output 14 and a second output 16. Input 12 in its most preferred form is shown as a hub for receipt of a shaft, not specifically shown. Suitable means such as keyway means may be provided in hub 12 for preventing mutual rotation of the shaft within hub 12. Generally, the outer surface of hub 12 includes first and second bearing mounts 18 and 20 located on opposite ends of hub 12 and splines 22 located intermediate bearing mounts 18 and 20.

First output 14 is shown in its most preferred form as a sheeve which is rotatably mounted to hub 12 by bearing 24. Bearing 24 is held in a nonsliding position on mount 20 of hub 12 by a snap retaining ring 26 received in a cavity formed on the outer surface of hub 12. Bearing 24 is further held in a nonsliding position relative to sheeve 14 by a retaining ring 28 received in sheeve 14. In its most preferred form, sheeve 14 has a diameter and further includes an integral, radially extending annular interface disc 30 having a diameter greater than the diameter of sheeve 14. In its most preferred form, disc 30 further includes a friction ring 32 mounted to disc 30 axially opposite from sheeve 14 and which forms an engagement, interrelating, and interface surface.

In the preferred embodiment of the present invention, output 16 generally includes a second sheeve unit 34 and a first housing portion 36 rotatably supported on hub 12. Specifically, housing portion 36 includes an annular body portion 38. The radially inward end 39 of body portion 38 defines an axially extending bore and is provided with a bearing mount 40. The radially outward end of body portion 38 terminates in an axially extending annular flange 42. Body portion 38 is then rotatably mounted to hub 12 by a bearing 44 located between mounts 18 and 40. Bearing 40 is held in a nonsliding relation to hub 12 by a retainer ring 46 received in a cavity formed in hub 12 and is held in a nonsliding position with respect to body portion 38 by a retaining ring 48 received in a cavity formed in body portion 38.

In its most preferred form, body portion 38 includes an annular recess 50 having a first, radially outward, axially extending surface and a second, radially inward, axially extending surface for reciprocally receiving and mounting an annular body portion 53 of a single, annular piston 52. It should then be appreciated that a fluid pressure cylinder for moving the piston in an axial direction is formed and defined by recess 50 of housing portion 36 and piston 52. In its most preferred form, an axially extending, annular flange 54 having a radially inward bearing mount 56 extends from the annular body portion 53 of piston 52 in a direction away from recess 50.

Input 12 of clutch 10 according to the preferred embodiment of the present invention further includes a friction interface disc 58 including a radially extending disc 60 having a first interface surface 62 and a second interface surface 64. Friction disc 58 further includes a hub portion 66 including splines 68 for slidable receipt upon splines 22 of hub 12. Hub portion 66 further includes a bearing mount 70. Piston 52 is axially or reciprocally related to friction disc 58 but rotatably mounted with respect to friction disc 58 by bearing 72 located between bearing mounts 56 and 70. Bearing 72 is prevented from axial movement in mount 56 by having its first race abut with a retaining ring 74 received in a cavity formed in friction disc 58 and is prevented from axial movement in mount 70 by having its second race abut with a retaining ring 76 received in a cavity formed in piston 52.

Sheeve unit 34 generally includes an annular, drive belt receiving, sheeve portion 78 having a radially inward surface 80 and further generally includes a radially extending, annular, housing disc portion 82 which defines an axially extending aperture 81. Disc portion 82 is secured to the free end of flange 42 of housing 36 by bolts 83. It can then be realized that sheeve 34 is connected to housing 36 by bolts 83 for rotation therewith in its most preferred form. Located radially inward from surface 80, disc portion 82 includes a radially extending surface or face 84 for mounting a friction ring 86 and which forms an engagement, interrelating, and interface surface. Disc portion 82 further includes a plurality of radially spaced, axially extending spring recesses 88. Clutch 10 further includes a plurality of springs 90 located in recesses 88 and abutting with piston 52 and for biasing piston 52 in an axial direction and specifically into recess 50. It can then be realized that springs 90 are located generally axially of friction ring 86 to thus directly counteract with the torque force placed on disc portion 82 by the rotatable interaction of interface surface 64 of friction disc 58 with friction ring 86 to thus evenly balance force transfer between friction disc 58 and piston 52. It can further be appreciated that output 16 including sheeve 34 and housing 36 is rotatably mounted to hub 12 by bearings 44 and 72.

In its most preferred form, clutch 10 further includes an end cap member 92 including a circular disc portion 94 and an axially extending, annular flange 96. Circular portion 94 is secured to body portion 38 of housing 36 to close off the axially outward, open end of the cylindrical bore defined by the radial inward end 39 of body portion 38. Flange 96 receives a fluid pressure rotary union 98 for defining a fluid cavity 100 within flange 96. Suitable fluid communication provisions 102 are provided for providing fluid pressure between cavity 100 and the fluid pressure cylinder defined and formed by recess 50 behind piston 52 and is shown in its most preferred form as a fluid conduit extending therebetween. It can then be realized that piston 52 and friction disc 58 axially related thereto is movable in a first axial direction by fluid pressure introduced into the fluid pressure cylinder by union 98 and provisions 102 and is movable in the opposite axial direction in the preferred embodiment by biasing piston 52 and in its most preferred form by springs 90.

In its most preferred form, clutch 10 further includes a manual actuation member 104 reciprocably mounted in body portion 38 and within recess 50 which functions as a short stroke piston. Member 104 may be manually advanced into recess 50 for abutting with and axially moving piston 52 against the bias of springs 90 by a set screw 108 threadably and axially received in body portion 38 of housing 36 which abuts with member 104. It can then be realized that clutch 10 can be manually activated by member 104 to rotatably relate first output sheeve 14 with input 12 if there is a failure in the fluid pressure supply. Further, member 104 may be utilized to find the center position of friction disc 58 wherein friction disc 58 does not interface with either of outputs 14 and 16 if desired, for example for setting the fluid pressure control.

In its most preferred form, friction disc 58 further includes an axially extending cavity 110 for reciprocal receipt of an axially extending annular flange 112 formed on sheeve 14. Cavity 110 and flange 112 have relatively close tolerances to form a rotary air seal in a similar manner as set forth and disclosed in U.S. Patent No. 3,497,046. Thus, cavity 110 and flange 112 prevent minute portions of friction ring 32 due to wear thereof or dust or other elements from passing to and upon splines 22 and 68. Furthermore, cavity 110 and flange 112 prevent grease from splines 22 and 68 and bearings 24, 34, and 72 from working outwardly to friction ring 32 where it defeats the purpose of the ring 32 and friction disc 58.

In operation and assuming fluid pressure has not been introduced to the fluid pressure cylinder formed by recess 50 by rotary union 98 and provisions 102, springs 90 bias piston 52 into recess 50. Due to the interrelationship of friction disc 58 with piston 52, friction disc 58 axially moves with piston 52 such that surface 64 frictionally engages, interrelates, and interfaces with friction ring 86 of sheeve 34 while surface 62 is spaced from and does not interface with friction ring 32 of sheeve 14. It can then be realized that output 16 is rotationally interrelated to the input 12 such that sheeve 34 and housing 36 rotate as a single member with input 12 while output 14 is rotatably independent from input 12 by bearing 24. However, if fluid pressure is introduced into the fluid pressure cylinder formed by recess 50 by rotary union 98 and provisions 102, piston 52 moves axially outward from recess 50 against the bias of springs 90. Due to the interrelationship of piston 52 with friction disc 58, with the axial movement of piston 52, surface 62 of friction disc 58 frictionally engages, interrelates, and interfaces with friction ring 32 of sheeve 14 while surface 64 is spaced from and does not interface with friction ring 86 of output 16. It can then be appreciated that output 14 is rotatably related to input 12 while output 16 is rotatably independent from input 12 by bearings 72 and 44.

Now that the construction and operation of clutch 10 according to the preferred embodiment of the present invention has been set forth, subtle features and advantages of the present invention can be set forth and appreciated. For example, it should be appreciated that housing 36 performs multiple functions and provides multiple advantages. First, housing 36 mounts sheeve 34 and thus forms the second output 16. Second, housing 36 serves as the selective interface with input 12 by including friction ring 86 mounted thereto in the preferred embodiment. Next, housing 36 reciprocally mounts piston 52 and with piston 52 forms and defines the fluid pressure cylinder for moving piston 52 against the bias of springs 90. Further, housing 36 mounts springs 90 axially in line with friction ring 86. Additionally, housing 36 rotatably mounts the second output sheeve 34 on the input 12. It can be further appreciated that housing 36 performs other functions than those specifically highlighted hereinbefore.

It should then be appreciated that due to the multiple function housing 36 and its interrelationship with other components of clutch 10, several advantages are obtained by clutch 10 according to the teachings of the present invention. First, clutch 10 provides a significant reduction in the number of clutch components. Therefore, clutch 10 is less prone to wear and breakdown and may be assembled in a quick and economic manner. Next, clutch 10 provides components which can be inexpensively cast and therefore can be economically manufactured. Additionally, clutch 10 is very axially compact with reduced rotational mass for reducing shaft balancing problems. It can be further appreciated that housing 36 and its interrelationship with other clutch components of clutch 10 result in other advantages than those specifically highlighted hereinbefore.

Further, it should be noted that utilizing a single interface disc 58 controlled by a single, double acting piston 52 for interfacing with an interface of either the first or second outputs 14 and 16 arrives at several advantages. For example, utilizing the teachings of the present invention, it is impossible to simultaneously interface with both outputs 14 and 16 which can result in damage to the clutch itself or the machine or other apparatus being controlled by the clutch. Likewise, control of clutch 10 can be easily provided utilizing a single source of fluid and without the complicated and extensive controls required when two pistons and/or two fluid cylinders are utilized as in prior clutches or in prior dual-speed control techniques.

It should be noted that due to the close tolerances provided between friction disc 58 and surface 80 of sheeve 34 and between disc 82 of housing 36 and flange 54 of piston 52, an air type seal is created in a manner similar to cavity 110 and flange 112. Specifically, due to the close tolerances and also due to the rotating interrelationship of friction disc 58 and sheeve 34 when friction disc 58 is interrelated with sheeve 14, dust and other elements are not prone to travel therebetween. Thus, a first volume defined by disc 82, housing 36, and piston 52 is created defining a substantially dust and element free environment within clutch 10. Likewise, a second volume defined by friction disc 58, sheeve 34, piston 52, input 12, disc 94, and portion 38 of housing 36 is created defining a substantially dust and element free environment within clutch 10. It should also be realized that the close tolerances of disc 82 and sheeve 34 also reduce the dust and element communication which otherwise would be subjected to the first volume set forth hereinbefore. Thus, the first and second volumes and the rotary air seal created by cavity 110 and flange 112 reduces the exposure of the clutch components to dust and other elements which increase frictional wear and interaction of the components.

It should be also appreciated that two-speed clutch 10 of the present invention can be supported solely by the shaft upon which input hub 12 is received and no other external support is required as shown in its most preferred form. Thus, two-speed clutch 10 can be utilized in numerous environments without extensive redesign of the machine or apparatus to be controlled by clutch 10.

It can then be appreciated that two-speed clutch 10 according to the present invention can be utilized in environments where control of an output is desired at two distinct speeds in a very economical manner. Thus, clutch 10 of the present invention eliminates the need for the use of two motors and two clutches as were utilized prior to the present invention in this type of environment. Furthermore, clutch 10 does not require complicated controls and is less prone to wear and breakdown. Thus, it should be appreciated that two-speed clutch 10 according to the present invention is clearly advantageous over prior clutches and techniques utilized in this environment.

Now that the basic teachings of the present invention have been explained, many extensions and variations will be obvious to one having ordinary skill in the art. For example, although input 12 is shown as a hub and outputs 14 and 16 are shown as sheeves, input 12 and outputs 14 and 16 may take other forms and constructions according to the teachings of the present invention.

Likewise, outputs 14 and 16 may have different sizes and relationships than as shown and described in the preferred embodiment of the present invention. For example, output 14 could have a larger diameter than output 16.

Additionally, fluid pressure may be provided to the fluid pressure cylinder in other manners than as shown and described in the preferred embodiment of the present invention.

Similarly, two-speed clutch 10 of the preferred embodiment of the present invention includes several features which synergistically relate with each other to provide an overall, preferred construction. However, features of the present invention may be utilized alone or with other known and unknown constructions than as shown and described with reference to the preferred embodiment of the present invention.

Furthermore, the reciprocal mounting of piston 52 by recess 50 of housing 36 is believed to be particularly advantageous as set forth hereinbefore; however, piston 52 may be reciprocally mounted in housing 36 by other constructions and techniques according to the preferred embodiment of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Two-speed clutch comprising, in combination: a hub for nonrotatably receiving an input shaft; a first output sheeve; means for rotatably mounting the first output sheeve on the input hub; a radially extending annular interface disc connected to the first output sheeve, with the annular interface disc including an interface surface; a first housing portion including an annular body portion having a radial inner end and a radial outer end terminating in an axially extending annular flange, with the annular flange having a free end; means located between the radial inner end of the first housing portion and the input hub for rotatably mounting the first housing portion on the input hub; a radially extending, annular housing disc having a first radial face; with the annular housing disc being secured to the free end of the annular flange of the first housing portion to form a housing; an interface surface formed on the first face of the annular housing for rotation therewith; an interface disc slidably mounted on the input hub for rotation therewith, with the interface disc of the input hub located between the interface surfaces of the first output sheeve and the annular housing disc, with the interface disc of the input hub including a first interface surface for rotatably relating with the interface surface of the first output sheeve and a second interface surface for rotatably relating with the interface surface of the annular housing disc; a single, annular piston; means for reciprocally mounting the piston in the housing; means for rotatably mounting the piston with respect to the interface disc of the input hub and for reciprocally relating the piston to the interface disc of the input hub for axial movement therewith; a fluid pressure cylinder formed by the housing and the piston; means for introducing fluid pressure into the fluid pressure cylinder for moving the piston in a first axial direction; means for biasing the piston in the opposite axial direction, with the biasing means comprising, in combination: a plurality of springs extending axially between the annular housing disc and the piston wherein the biasing means moves the piston and the input interface disc in the first axial direction for rotatably relating the input hub with one of the interface surfaces of the first output sheeve and the annular housing disc and when fluid pressure is introduced into the fluid pressure cylinder, the piston and the input interface disc moves in the opposite axial direction for rotatably relating the input hub with the other of the interface surfaces of the first output sheeve and the annular housing disc; wherein the radial inner end of the annular body portion of the first housing portion defines an axially extending bore having an axially outward end; wherein the fluid pressure introducing means comprises, in combination: a circular disc secured to the annular body portion of the first housing portion having a size and shape for covering the axially outward end of the annular body portion of the first housing portion, an axially extending, annular flange extending from the circular disc in a direction opposite from the annular body portion of the first housing portion, a fluid pressure rotary union connected to a source of fluid pressure received within the annular flange of the circular disc for defining a pressure cavity by and between the circular disc, the annular flange, and the rotary union, and passage means for communicating the fluid pressure from the pressure cavity to the fluid pressure cylinder; wherein the annular housing disc has an axially extending aperture extending therethrough, wherein the piston includes at least a portion thereof having a shape and size for receipt in the aperture of the annular housing disc and with relatively close tolerances to form a restricted air passage therebetween for reducing passage of dust and other elements therethrough; a rotary air seal provided between the input interface disc and the first output sheeve for preventing passage of dust and other elements therethrough; and wherein the rotary air seal, the piston, the housing, the circular disc, and the close tolerances between the annular housing disc and the input interface disc define a restricted dust and other element environment for the clutch.

2. The two-speed clutch of claim 1 wherein the piston reciprocally mounting means comprises, in combination: an axially extending recess formed in the annular body portion of the first housing portion; wherein the axially extending recess of the first housing portion includes a first, radially outward, axially extending surface and a second, radially inward, axially extending surface, wherein the piston is annular in shape and includes at least a portion thereof having a shape and size for reciprocal receipt in the recess and between the first and second axially extending surfaces of the recess of the first housing portion; and wherein the fluid pressure cylinder is formed by the recess of the first housing portion and the piston.

3. The two-speed clutch of claim 1 wherein the rotatably mounting and reciprocally relating means comprises, in combination: a bearing having a first race in a nonsliding relation to the piston and having a second race in a nonsliding relation to the input interface disc.

4. The two-speed clutch of claim 1 wherein the input interfacing disc comprises, in combination: a friction disc having a first frictionally engaging interface type surface for frictionally interrelating with the interface surface of the first output sheeve and having a second frictionally engaging interface type surface for frictionally interrelating with the interface surface of the annular housing disc.

5. Two-speed clutch for selective rotational relation of an input with a first output and a second output comprising, in combination: a housing including a first housing portion and a second housing portion; with the first housing portion including an annular body portion having a radial inner end and a radial outer end terminating in an axially extending annular flange; with the second housing portion including a radially extending interface surface; with the annular flange having a free end, with the second housing portion being secured to the free end of the annular flange of the first housing portion; wherein the second housing portion is annular having an axially extending aperture extending therethrough, with the aperture of the second housing portion having a diameter defined by a radially inward facing surface; with the first output including an interface surface; with the second output being interconnected to the housing for preventing relative rotation therebetween; with the input including means located between the interface surface of the housing and the interface surface of the first output for inferfacing and rotatably relating the input with one of the interface surfaces of the housing and the first output; a piston; means for reciprocally mounting the piston in the housing independent of the aperture of the second housing portion; means for rotatably mounting the piston with respect to the interface means of the input and for reciprocally relating the piston to the interface means of the input for axial movement together; a fluid pressure cylinder formed by the housing and the piston; means for introducing fluid pressure into the fluid pressure cylinder for moving the piston in a first axial direction; means for biasing the piston in the opposite axial direction, with the biasing means comprising, in combination: a plurality of springs extending axially between the second housing portion and the piston wherein the biasing means move the piston and the input interface means in the first axial direction for rotatably relating the input with one of the interface surfaces of the first and second outputs and when fluid pressure is introduced into the fluid pressure cylinder, the piston and the input interface means move in the opposite axial direction for rotatably relating the input with the other of the interface surfaces of the first and second outputs and wherein simultaneous interfacing of the input interface means with both of the interface surfaces of the first and second output is prevented; wherein the piston includes at least a portion thereof having a shape and size for receipt within the aperture of the second housing portion but in a spaced condition from the radially inward facing surface of the second housing portion and with relatively close tolerances to form a restricted air passage between the piston portion and the radially inward facing surface of the second housing portion for reducing passage of dust and other elements therethrough.

6. The two-speed clutch of claim 5 wherein the piston reciprocally mounting means comprises, in combination: an axially extending recess formed in the annular body portion of the first housing portion.

7. The two-speed clutch of claim 6 wherein the axially extending recess of the first housing portion includes a first, radially outward, axially extending surface and a second, radially inward, axially extending surface, wherein the piston is annular in shape and includes at least a portion thereof having a shape and size for reciprocal receipt in the recess and between the first and second axially extending surfaces of the recess of the first housing portion; and wherein the fluid pressure cylinder is formed by the recess of the first housing portion and the piston.

8. The two-speed clutch of claim 5 wherein the outputs comprise sheeves; and wherein the sheeve forming the second output is integral with the second housing portion.

9. The two-speed clutch of claim 5 wherein the rotatably mounting and reciprocally relating means comprises, in combination: a bearing having a first race in a nonsliding relation to the piston and having a second race in a nonsliding relation to the input interface means.

10. The two-speed clutch of claim 9 further comprising, in combination: means for rotatably mounting the housing on the input comprising a bearing located between the radial inner end of the annular body portion of the first housing portion and the input.

11. The two-speed clutch of claim 5 wherein the outputs comprise sheeves; wherein the first output includes a radially extending disc, with the interface surface of the first output being formed on the radially extending disc.

12. The two-speed clutch of claim 5 further comprising, in combination: means for rotatably mounting the first output on the input.

13. The two-speed clutch of claim 12 further comprising, in combination: means for rotatably mounting the housing on the input.

14. The two-speed clutch of claim 5 wherein the radial inner end of the annular body portion of the first housing portion defines an axially extending bore having an axially outward end; and wherein the fluid pressure introducing means comprises, in combination: a circular disc secured to the annular body portion of the first housing portion having a size and shape for covering the axially outward end of the annular body portion of the first housing portion; an axially extending, annular flange extending from the circular disc in a direction opposite from the annular body portion of the first housing portion; a fluid pressure rotary union connected to a source of fluid pressure received within the annular flange of the circular disc for defining a pressure cavity by and between the circular disc, the annular flange, and the rotary union; and passage means for communicating the fluid pressure from the pressure cavity to the fluid pressure cylinder.

15. The two-speed clutch of claim 14 further comprising, in combination: a rotary air seal provided between the input interface means and the first output for preventing passage of dust and other elements therethrough; and wherein the first and second housing portions, the circular disc, the rotary air seal, the piston, and the close tolerances between the second housing portion and the input interface means define a restricted dust and other element environment.

16. The two-speed clutch of claim 5 wherein the input interfacing means comprises, in combination: a friction disc having a first frictionally engaging interface type surface for frictionally interrelating with the interface surface of the first output and having a second frictionally engaging interface type surface for frictionally interrelating with the interface surface of the housing; and means for slidably mounting the friction disc on the input for rotation therewith.

17. In an apparatus for controlling rotation between an input and an output, with the rotation control apparatus including a housing and means for selectively rotationally interrelating the input and the output actuated by a piston, with the improvement comprising an axially extending aperture extending through the housing, with the aperture of the housing having a diameter defined by a radially inward facing surface; means for reciprocally mounting the piston in the housing independent of the aperture; wherein the piston includes at least a portion thereof having a shape and size for reciprocal receipt within said aperature but in a spaced condition from said surface and with relatively close tolerances to form a restricted air passage between said portion and said surface for reducing passage of dust and other elements therethrough.

18. The rotation control apparatus of claim 17 wherein the housing, the piston, and the relatively close tolerances between the piston portion and the housing aperture define a restricted dust and other element environment.

19. An apparatus for controlling rotation between an input and an output comprising, in combination: a housing, with the housing including an annular body portion having a radial inner end defining an axially extending bore having an axially outward end; means located between the radial inner end of the annular body portion of the housing and the input for rotatably mounting the housing on the input; a circular disc secured to the annular body portion of the housing having a size and shape for covering the axially outward end of the annular body portion of the housing; means for selectively rotationally interrelating the input and the output actuated by a piston reciprocally mounted in the housing; an axially extending aperture extending through the housing, with the aperture of the housing having a diameter; wherein the piston includes at least a portion thereof having a shape ans size for reciprocal receipt in the aperture of the housing and with relatively close tolerances to form a restricted air passage therebetween for reducing passage of dust and other elements therethrough; with the selectively rotationally interrelating means including a rotary air seal for preventing passage of dust and other elements therethrough; and wherein the housing, the input, the circular disc, the rotary air seal, the piston, and the close tolerances between the piston portion and the housing aperture define a restricted dust and other element environment.

20. An apparatus for controlling rotation between an input and an output comprising, in combination: a housing; means for selectively rotationally interrelating the input and the output actuated by a piston reciprocally mounted in the housing; an axially extending aperture extending through the housing, with the aperture of the housing having a diameter; wherein the piston includes at least a portion thereof having a shape and size for reciprocal receipt in the aperture of the housing and with relatively close tolerances to form a restricted air passage therebetween for reducing passage of dust and other elements therethrough, wherein the selectively rotationally interrelating means comprises, in combination: an interface disc axially reciprocable on the input at least between a first acfuation position and a second actuation position, with the interface disc having a radially outward end, and means for reciprocally relating the piston to the interface disc; and wherein the housing further includes an axially extending surface with relatively close tolerances from the radially outward end of the interface disc creating an air type seal therebetween such that dust and other elements are not prone to travel therebetween.

* * * * *

UNITED STATES PATENT OFFICE
CERTIFICATE OF CORRECTION

Patent No. 4,657,126            Dated April 14, 1987

Inventor(s) James V. Hanks and Edward Brooks

It is certified that error appears in the above-identified patent and that said Letters Patent are hereby corrected as shown below:

IN THE CLAIMS

Column 7, line 29, claim 1, after "annular" insert --housing disc; a second output sheeve interconnected to the--

Signed and Sealed this

Twenty-fifth Day of August, 1987

*Attest:*

DONALD J. QUIGG

*Attesting Officer*      *Commissioner of Patents and Trademarks*